US005363121A

United States Patent [19]
Freund

[11] Patent Number: 5,363,121
[45] Date of Patent: Nov. 8, 1994

[54] MULTIPLE PROTOCOL COMMUNICATION INTERFACE FOR DISTRIBUTED TRANSACTION PROCESSING

[75] Inventor: Thomas J. Freund, Austin, Tex.

[73] Assignee: International Business Machines Corporation, Armonk, N.Y.

[21] Appl. No.: 546,495

[22] Filed: Jun. 29, 1990

[51] Int. Cl.[5] ............................................. G06F 13/00
[52] U.S. Cl. .................................... 395/600; 395/200; 395/325; 364/282.1; 364/282.4; 364/DIG. 1
[58] Field of Search .................. 364/DIG. 1, DIG. 2; 395/200, 650, 325, 800, 425, 600

[56] References Cited

U.S. PATENT DOCUMENTS

| | | | |
|---|---|---|---|
| 4,412,285 | 10/1983 | Neches et al. | 364/200 |
| 4,418,382 | 11/1983 | Larson et al. | 364/200 |
| 4,430,699 | 2/1984 | Segarra et al. | 395/200 |
| 4,493,021 | 1/1985 | Agrawal et al. | 364/200 |
| 4,513,373 | 4/1985 | Sheets | 364/200 |
| 4,569,015 | 2/1986 | Dolev et al. | 395/200 |
| 4,631,666 | 12/1986 | Harris et al. | 364/200 |
| 4,742,447 | 5/1988 | Duvall et al. | 395/375 |
| 4,760,395 | 7/1988 | Katzeff et al. | 340/825.03 |
| 4,819,159 | 4/1989 | Shipley et al. | 364/200 |
| 4,881,166 | 11/1989 | Thompson et al. | 395/600 |
| 4,975,830 | 12/1990 | Gerpheide et al. | 395/200 |
| 5,001,624 | 3/1991 | Hoffman et al. | 395/375 |
| 5,047,925 | 9/1991 | Kun et al. | 395/200 |
| 5,062,037 | 10/1991 | Shorter et al. | 395/375 |
| 5,142,622 | 8/1992 | Owens | 395/200 |

OTHER PUBLICATIONS

"A Client-Based Transaction System to Maintain Data Integrity," W. H. Paxton, Xerox Palo Alto Research Center Association for Computer Machines, 1979.
"Simulation of Concurrency Control and Recovery Protocols for Distributed Database Systems," N. Griffeth, M. Morsi, Georgia Institute of Technology, IEEE, 1984.
"High-Performance, Multi-Link, Multi-Protocol Data Link Controller for an Experimental Distributed Computer Testbed," T. Chan, D. Bhatt, W. Heimerdinger, L. Kinney, M. Lum, Honeywell Systems and Research Center, IEEE, 1984.
"Performance of Protocols for Hybrid Distributed--Centralized Systems with Regional Locality," B. Ciciani, D. Dias, P. S. Yu.
IBM Research Center, Research Report, 1988.
"Analysis of a Commercial Implementation of Multiple 2 Phase Commitment Protocols Within a Single Operating System Integrity Control Layer," D. Egolf, Honeywell Bull Inc., IEEE, 1989.
Operating Systems Review (SIGOPS) 23 (1989), No. 5, New York, "Analysis of Transaction Management Performance", D. Duchamp pp. 177–189.
Campus de Beaulieu, 35042 Rennes cedex (France), "Implementing Atomic Rendezvous within a Transaction Framework", J. P. Banatre et al, pp. 119–128.
IEEE 1988, "Camelot: A Flexible, Distributed Transaction Processing System", A. Z. Spector et al, pp. 432–437.
Operating Systems Review, "Distributed Transactions for Reliable Systems", A. Z. Spector et al, vol. 19, No. 5, spec. issue, pp. 127–146.

*Primary Examiner*—Thomas C. Lee
*Assistant Examiner*—Paul R. Lintz
*Attorney, Agent, or Firm*—Mark E. McBurney

[57] ABSTRACT

A communication interface is provided for use in a distributed transactional processing environment which allows a program application to be directly written to a resource and provides a communication interface between plural transaction processing systems. The present invention also informs all participating transaction managers of the existence of a transaction and further informs the local transaction manager of all sites which are participating the the transaction. Specific communication protocols are defined which allow any type of communication services to be utilized to provide the communication link. Additionally, the transactional and communication management functions are separated, allowing the communication manager to perform functions previously implemented by the transaction manager.

16 Claims, 7 Drawing Sheets

MULTIPLE PROTOCOL COMMUNICATION INTERFACE FOR DISTRIBUTED TRANSACTION PROCESSING

CROSS REFERENCE TO RELATED APPLICATIONS

Co-pending U.S. patent application, Ser. No. 07/395,249, filed Aug. 17, 1989 and assigned to the assignee of the present invention, now U.S. Pat. No. 5,095,421.

BACKGROUND OF THE INVENTION

Distributed transaction processing allows a transaction to be implemented at various locations within a distributed processing system. In order to implement this transaction processing, a communication service must be provided between each program application, local and remote resources and the transaction managers participating in the transaction. Conventional transaction processing systems provide communication protocols which support a single proprietary communication service. Further, emerging standards, particularly those relating to a UNIX operating system (UNIX is a registered trademark of AT&T) do not address the issue of allowing different communication protocols to co-exist within a distributed transaction processing environment. Existing standards include the definition of a proprietary communication as part of a distributed transaction processing protocol definition, and further define an application interface for distributed transaction processing which contains transaction management and proprietary communication functions.

Conventional distributed transaction processing systems utilize a transaction manager and communication manager (service) resident in the same layer of software. This architecture will not allow a program application to write directly to the communication manager, but requires the application to communicate via the transaction manager. Further, existing communication applications must be rewritten to use the communications facilities provided within the distributed transaction processing system, and greater system overhead is sustained due to the mapping required between a generic communication service and specific proprietary communication protocol.

It would be extremely useful in terms of flexibility and efficiency to be able to define an environment by establishing a method which supports the utilization of any communication protocol within a distributed transaction processing environment.

SUMMARY OF THE INVENTION

In contrast to the prior art, the present invention allows any communications programming interface to be used within a distributed transaction processing system. The present invention provides a mechanism for constructing a distributed transaction processing environment that supports any communication programming interface. Further, an architecture definition is described for any interface between the transaction management and communications functions within a transaction processing system.

In addition to the functions of registration and the two phase commit protocol, the present invention provides transaction propagation and transaction event handling protocols. The present invention effectively separates the communications and transaction management functions into two independent functions. Thus, the application is now capable of writing directly to and reading from the communications manager. The communications manager is treated by the architecture of the present invention as another resource, in a manner similar to a database resource or the like. In this manner, the communications managers associated with a specific transaction are linked without the necessity of all communications therebetween being passed through one or more transaction managers.

Any communications service desired to link these communications managers will be supported by the present invention through the new communication protocol (propagation and event handling) mentioned above. These communication protocols provide: (1) propagation services, i.e. propagation of information regarding particular transactions between transaction managers; and (2) event handling services whereby interrupts are serviced by means other than the normal two phase commit protocol, e.g. heuristic decision. Additionally, since the separate communication manager is treated by the present invention as any other resource, the application may assign transactional responsibilities to the communication manager which are traditionally performed by the transaction manager.

DETAILED DESCRIPTION OF THE PREFERRED EMBODIMENTS

Figure 1:
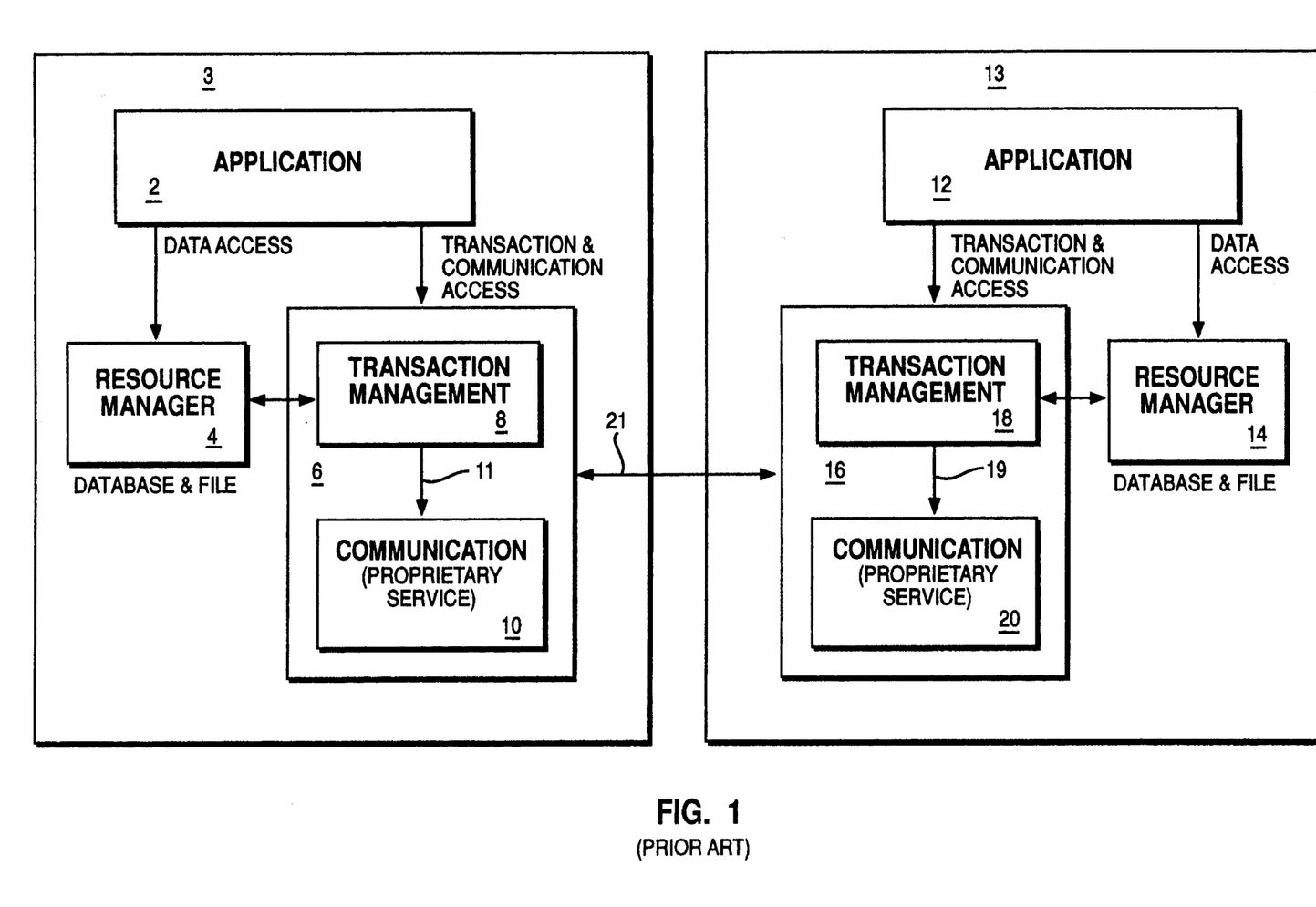
FIG. 1 is a block diagram illustrating a prior art distributed transaction processing system wherein the transaction manager and communication manager are incorporated into a single software layer.

Referring to FIG. 1, a prior art distributed transaction processing environment is shown and noted by reference numeral 1. First and second transaction processing systems 3, 13, respectively, represent local and remote systems and are connected by a communications link 21. Transaction processing system 3 includes program application 2 and resource manager 4, having a data base and file capability. A transaction layer 6 is shown and includes transaction manager 8 and proprietary communication service 10.

Similarly, transaction processing system 13 includes program application 12 and resource manager 14, capable of performing data base and file functions. Transactional layer 16 is also included and has transaction manager (TM) 18 and proprietary communication service 20 contained therein. Further, transaction managers 8, 18 each communicate with their associated proprietary communications services 10, 20 through communication links 11 and 19, respectively. It can be seen from FIG. 1, that transaction managers 8 and 18 are only capable of communicating with one another through their respective communication proprietary services 10, 20. Additionally, applications 2 and 12, as well as resource managers 4 and 14 are similarly limited in that any communication between remote and local applications and/or resources must be made through communications interface 21 and is subject to the limitation of the proprietary communications services 10 and 20.

Figure 4:
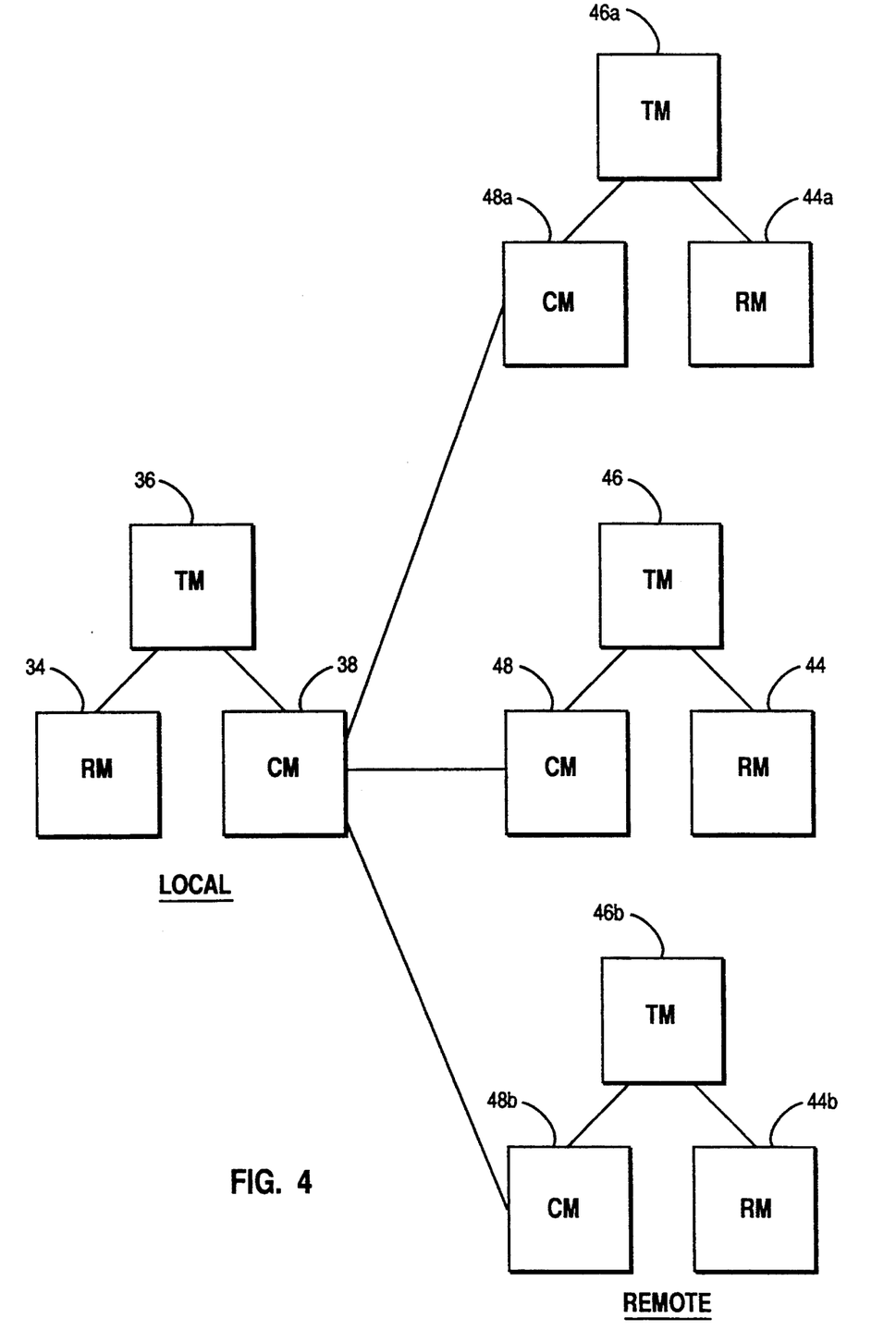
FIG. 4, illustrates a distributed transaction processing environment, as contemplated by the present invention.

The structure of the present invention will now be described with reference to FIG. 2. The distributed transaction processing environment 30 is shown including first and second transaction processing systems 31 and 41, respectively. These systems represent local and/or remote systems, or host and/or server systems within a distributed transaction processing environment. It should be noted that multiple remote transaction processing systems are contemplated by the present invention as shown by FIG. 4. Referring to transaction processing system 31, a program application 32 and resource manager (RM), (resources) 34, having data base and file capability are shown, and in communication with one another through a data access interface 33. Independent communication service 38, which is effectively a communications resource (CR), but will hereinafter be described as communications manager (CM), is shown as another resource manager. It should be noted that the communication service can be considered as a resource manager supervising resources which correspond to a plurality of communication protocols. Application 32 and communications manager 38 are in communication through interface 35. The transaction manager is noted by reference numeral 36 and is in communication with application 32, via interface 40; resource manager 34 via communication interface 37; and communication manager 38 via communication interface 39.

Similarly, transaction processing system 41 includes program application 42, resource manager 44 (data base and file), communication manager 48 and transaction manager 46. Communication interface 45 connects application 42 with communication manager 48 and communication interface 43 connects application 42 with resource manager 44. The transaction manager 46 communicates with application 42, resource manager 44, and communications manager 48 via communication interfaces 50, 47 and 49, respectively. In a distributed environment, communication interface 51 is utilized to connect the communication services present in each individual transaction processing system. It can be seen from FIG. 2, that transaction processing system 31 is capable of communicating with transaction processing system 41 directly through each systems communication managers 38 and 48. Therefore, the communication between transaction processing system 31 and 41 are not restricted to the communications services provided by the transaction manager (as shown in FIG. 1), but systems 31, 41 are capable of communicating with any communication protocol provided by the communications managers 38 and 48. These protocols may include Open Systems Interconnect (OSI), System Network Architecture (SNA), or the like.

The present invention provides the interface between transaction managers 36, 46 and communication managers 38, 48, respectively. Although the communication services has been separated from the transaction manager, protocol must be provided such that the transaction managers 36 and 46 recognize when distributed transactional events have occurred. That is, the transaction managers do not need to know how the data was communicated between individual transaction processing systems, but must know that data has been communicated, where it has been communicated from, or to and any actions taken by remote transaction managers. The present invention allows this separation between communication services and transaction management while maintaining the requirements of a distributed transaction processing environment.

Figure 3A:
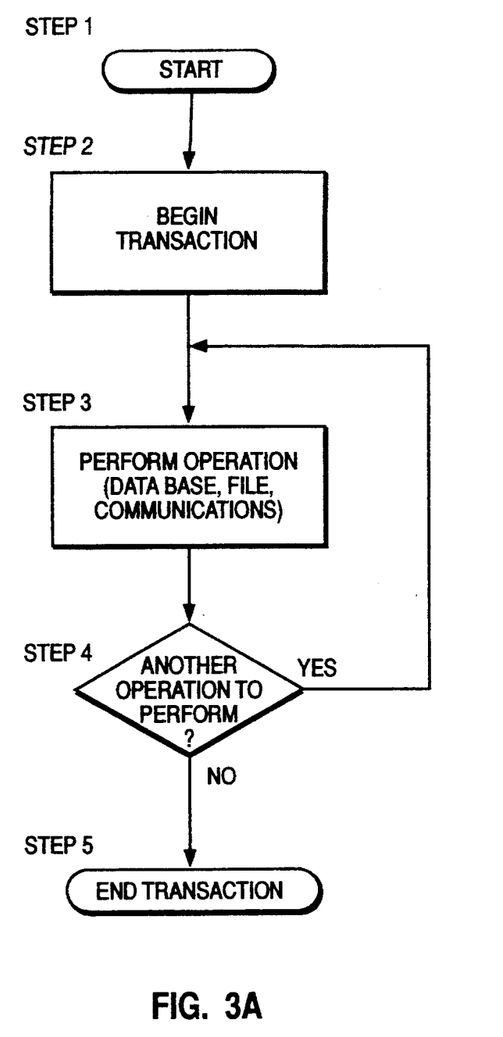
FIGS. 3A through 3E are flowcharts including the steps required by the communication protocol of the present invention to support the use of any desired communication service.

The present invention will now be described with reference to flowcharts 3A-3E. FIG. 3A illustrates a typical transaction processing method. At step 1, a program application initiates the process and at step 2 the transaction is begun. Step 3 performs the transaction processing operations which may include data base and file functions, as well as communication services. It is determined at step 4, whether another transaction operation is remaining to be performed. If so, the process returns to step 3 where the new operation is begun. If no operations are remaining, then the transaction ends at step 5.

The present invention particularly addresses the communication services provided during transactional processing. Therefore, the flowchart of FIG. 3B shows the processes required to implement the present invention with regard to the communications portion of the performed transaction (step 3) of FIG. 3A, i.e. flowchart of FIG. 3B is a subset of step 3 of FIG. 3A.

Figure 2:
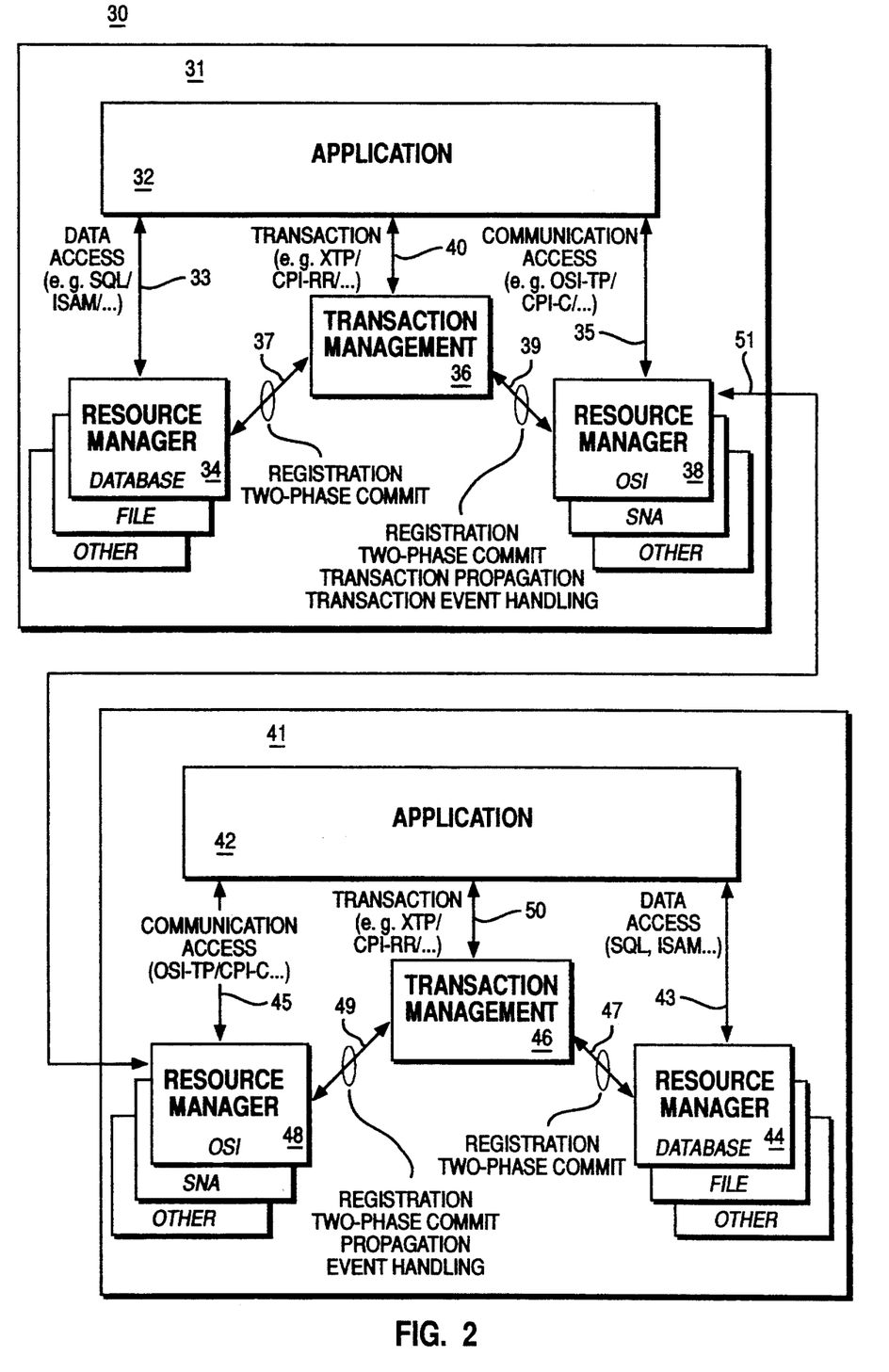
FIG. 2 is a block diagram showing the distributed transaction processing system of the present invention having the communication and transaction management functions separated, thereby supporting the utilization of any communication service.

In order to implement the present invention, transaction managers 36 and 46 must delegate some of the conventional transaction activities normally performed by a transaction manager (FIG. 1) to the communication managers 38, 48 such that the communications managers become a separate component of distributed transaction processing environment, as shown in FIG. 2. In this manner, the communications managers are capable of performing strictly communications functions allowing data to be transferred between distributed transaction processing systems, a strictly transactional function whereby the communications manager assists the transaction manager in transaction processing. There also exists a hybrid function wherein the communications manager provides communication function and transactional processing.

Figure 3B:
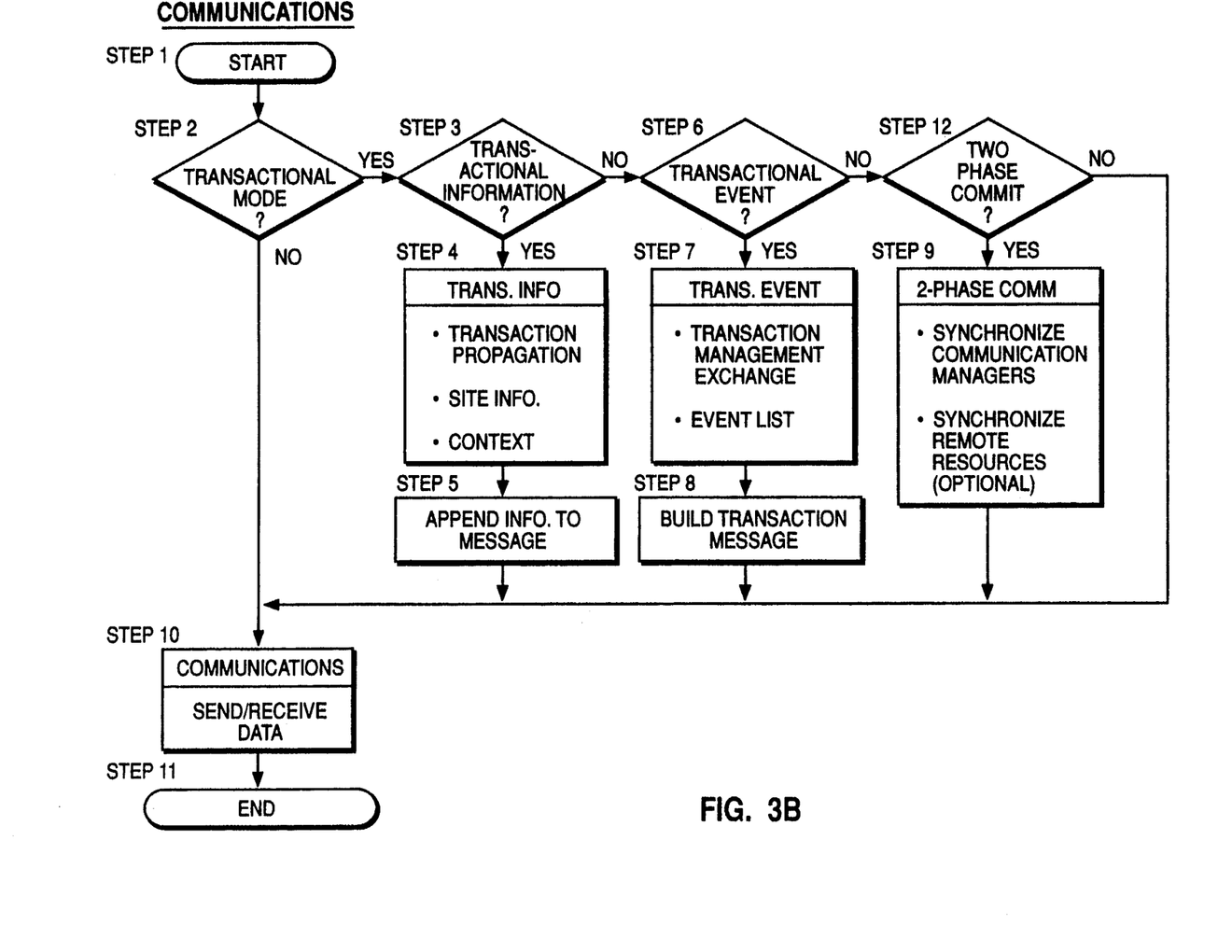

Referring to FIG. 3B, the communications services function starts at step 1 and step 2 determines whether the communications manager is to be used in a transactional mode or merely as a communication link for passing data. If the communications manager is to be utilized in a transactional mode, then step 3 determines whether transactional information is to be processed. Transactional information processing (step 4) includes transaction propagation, site information and context. The communications manager provides the transaction manager with information regarding the propagation of the transaction, i.e. what locations are involved in the transaction processing. Site information includes details from the locations participating in the transaction regarding any remote resource and data bases and files which are participating. Context refers to the actual data which is being transferred from any remote locations to the transaction manager via the communications manager. At step 5, the communications manager then appends the above noted information (propagation, site information, context) to any messages for the transaction manager. If at step 3 it is determined that the communications manager is not functioning in a transactional information mode, then step 6 determines whether a transactional event requires processing. If so, step 7 provides that the communications manager will function to exchange data regarding current transactional events between transactional managers participating in the transaction. Also at step 7, the communication managers builds an event list which includes local events and remote events. Local events are distributed through the communications interface to the remote transaction processing systems, whereas remote events are transmitted to the local transaction manager. Subsequent to step 7, the transaction message, including the information received by step 7, is built at step 8. If at step 6 it is determined that the communications manager is not performing a transactional event, then it is determined at step 12 whether the communication manager is supervising a two phase commit process. If so, step 9 allows the communications manager to provide standard two phase commit protocol support (prepare, commit, abort). This two phase commit allows for synchronization between all participating communications resources and other resources, i.e. data base and file or the like. Additionally, the two phase commit provides synchronization between local and any participating remote resources including communications, as well as data base and file.

Figure 3C:
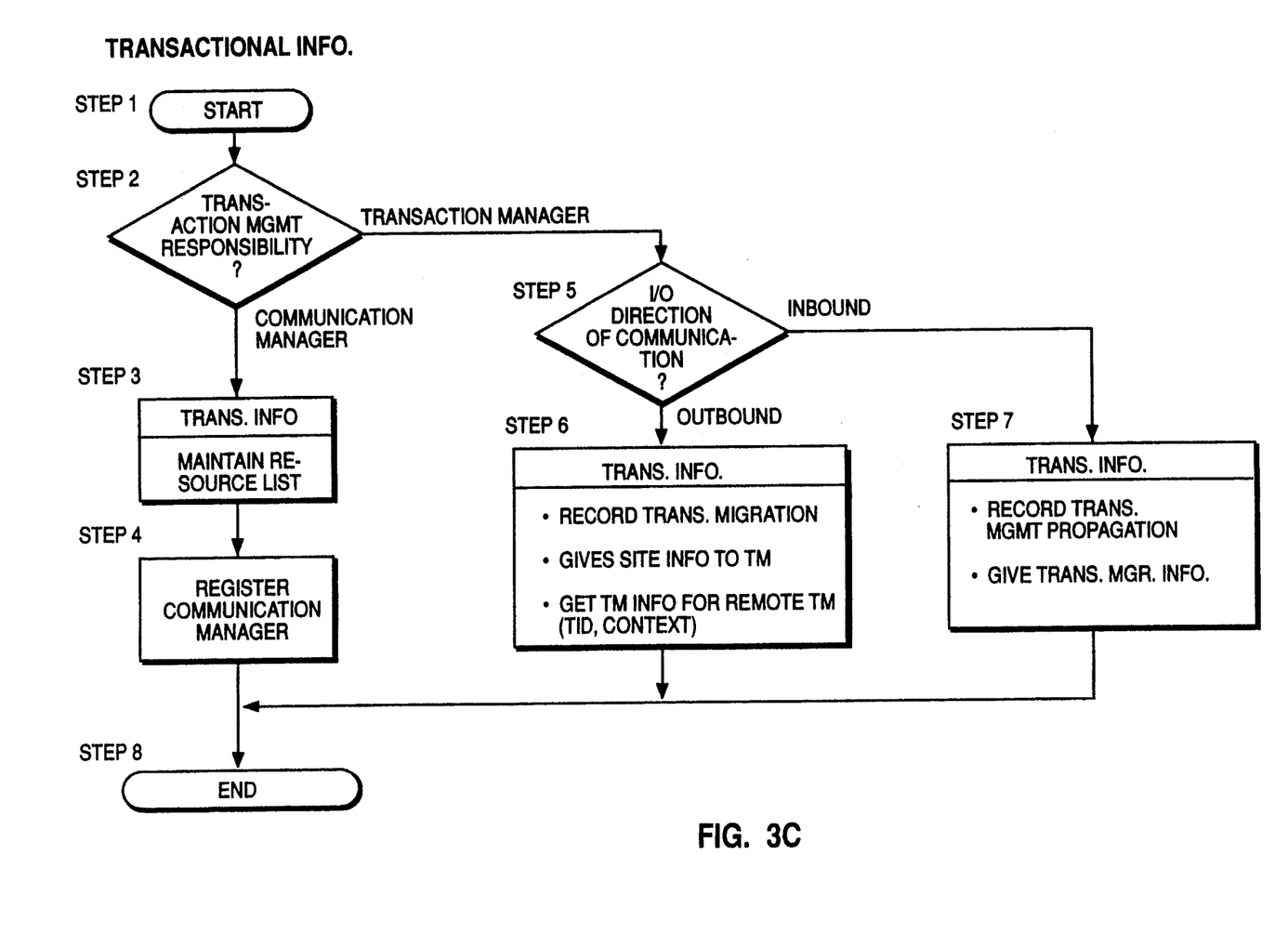

Subsequent to steps 5, 8, 9 and if determined at step 12 that no two phase commit is to be supervised by the communications manager, then the present invention continues to step 10 wherein standard communications support is provided. That is, the communications manager sends and receives data between distributed transaction processing system. If at step 2 it was determined that the communications manager was not being utilized in a transactional mode or if steps 3, 6, 12 do not require transactional information, transactional event, or two phase commit processing, respectively, then the present directly proceeds to step 10 since in that case the communications manager is being utilized to provide communications services only. After step 10, the process ends at step 11. It should be noted that FIG. 3B represents the situation where: (1) a communication services function is implemented, i.e. steps 2 and 10; (2) the communication manager is utilized in conjunction with the communication services function, i.e. steps 2-8, and 10; and (3) a hybrid function, wherein the communication services function and communications manager is augmented by transactional processing capability i.e. steps 2-10 and 12. In the cases where the communications manager is responsible for transactional information, transactional event handling and some of the two phase commit processing, the communications manager was operating in the hybrid mode since function other than the purely communication services of step 10 are provided. FIG. 3C represents in greater detail, the steps required by the present invention during the transaction information phase of FIG. 3B. FIG. 3C can be considered to be a subset of step 4 of FIG. 3B.

At step 1 of FIG. 3C, the transactional information process is started and step 2 determines whether the transaction responsibility lies with the transaction manager or the communications manager. If the communication manager is responsible for some portion of transaction processing, then at step 3 a list of all resources participating in the transaction is maintained. Step 4 registers the communication manager (as a communication manager, not a strictly communication service) with the transaction manager.

However, if the transaction manager is responsible for transaction processing, then step 5 determines whether the communication is directed inwardly or outwardly. If the data communication is outbound, then at step 6 the communications manager records transaction migration to the remote sites, i.e. the communications manager records the remote locations to which the transaction has been communicated. Also at step 6 the communications manager transmits site information to the remote transaction manager (local information that is required by the remote transaction manager). Finally at step 6, the communications manager receives, from the transaction manager, the information to be communicated to the remote participating transaction manager, i.e. the transaction identifier (TID) and the context of the messages to be transmitted.

If it is determined at step 5 that the communication direction is inbound, then at step 7 the communications manager records the transaction management propagation, i.e. the remote sites to which the transaction has in fact been propagated, or been communicated. This is in contrast to the recording of the transaction and migration at step 6, wherein the communication manager recorded the remote sites where the transaction will be migrated, not those sites to which the transaction has already propagated. In steps 6 and 7 of this flowchart, transactional management responsibility lies with the transactional manager not the communications manager, and is based on site information. During the transaction event handling a portion the communications manager is merely a communications interface to transmit data between remote and local transaction managers for the purpose of exchanging information in order to affect a two phase commit between transaction managers. In other words, the communications manager provides a communication service which allows remote and local transaction managers to be in communication with each other in order to synchronize, or coordinate the two phase commit protocol. Subsequent to steps 4, 6 and 7, the transaction information portion of the present invention, as shown in the flowchart of FIG. 3C, ends at step 8.

Figure 3D:
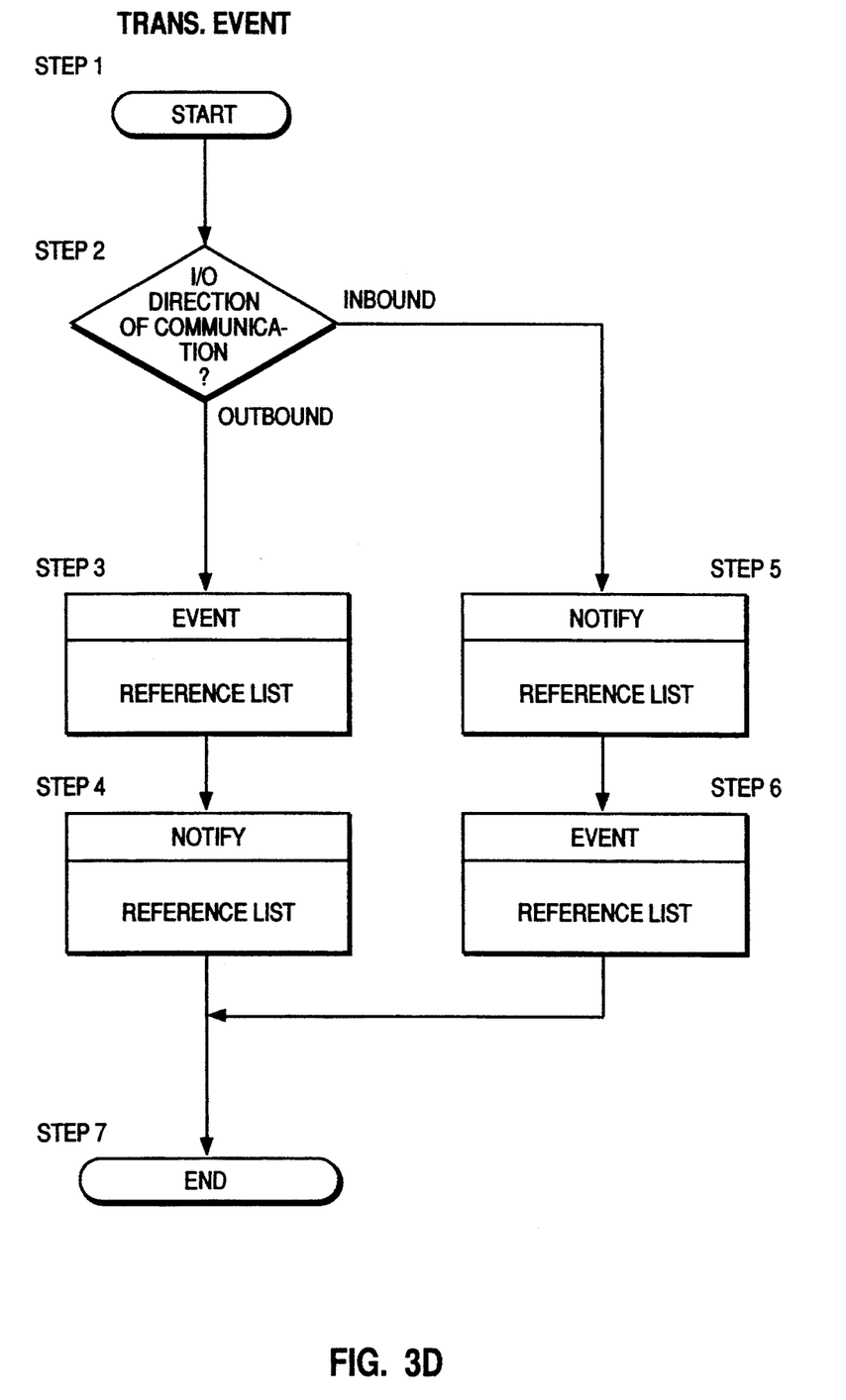

With reference to the flowchart of FIG. 3D, the process is started at step 1 and step 2 determines whether the data communication is inbound to the local transaction processing system, or outbound to a remote transaction processing system. If the communication is outbound, then at step 3 the communications manager records the event, which is part of the transaction, to be communicated to any remote participating transaction manager. This event is added to a reference list maintained by a communications manager. Step 4 notifies the participating transaction managers (remote) of the forthcoming event. If at step 2 it was determined that the information is inbound, the communication manager receives (step 5) the reference list being communicated from remote participating transaction processing systems which serves to notify the local transaction processing system of the forthcoming event. At step 6 the communication manager then actually receives the reference list containing the event for which notification was previously received at step 5. After step 4, for outbound communication and step 6, for inbound communication, this process ends at step 7. It can be seen that the transaction event handling undertaken by communication manager in FIG. 3D allows information to be passed between communication managers and aids in implementation of a two phase protocol.

Figure 3E:
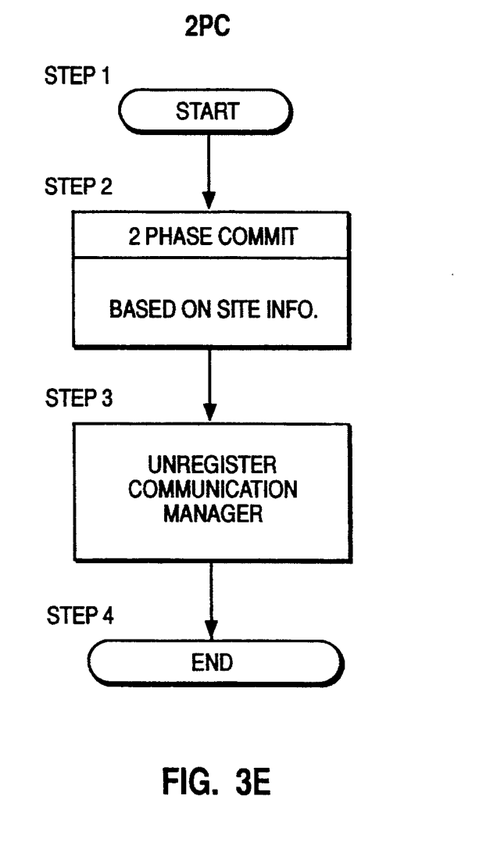

FIG. 3E is a flowchart representing the actual two phase commit protocol which occurs at the completion of a transaction. FIG. 3E is representative of step 9 included in FIG. 3B. The process starts at step 1 and at step 2 the actual two phase commit is performed. This includes the synchronization between transaction managers as previously discussed and the commit, abort and prepare protocols associated with a standard two phase commit. The communications manager is unregistered after becoming registered in step 4 of FIG. 3C. The unregistration allows the communication manager to disassociate itself with the transaction being committed. Finally, the two phase commit process ends at step 4. During the two phase commit protocol, the communications manager has transactional management responsibility for the transaction being committed, and further coordinates local communication managers and appropriate remote resources for implementing the two phase commit.

An example of a typical transaction processing operation utilizing a distributed transaction processing system 30 of FIG. 2, in conjunction with flowcharts 3A–3E will now be described. Initially, a program application 32 (considered to be part of a local transaction processing system 31) determines that a transaction must be performed and starts the process, at step of 1 FIG. 3A, and begins the actual transaction at step 2. Step 3 then actually begins the performance of the transactional operation, which may include file, data base or communications operations. The present invention relates to communication operations and thus the data base and file activities are outside the scope thereof. Therefore, assuming a communications operation is to be performed at step 3, of FIG. 3A, the present invention implements the communications operation as shown in FIG. 3B, which is an overview of all communication operations.

The flowchart of FIG. 3A represents a possible implementation of the transactional processing communication protocol of the present invention. However, it must be understood that other means exist which will invoke the present inventions, such as inclusion of the transaction processing system (41,31) in a remote transactional process, or other external programs, such as an application, or the like. Since, step 2 of FIG. 3A has implemented a transactional processing mode, the decision at steps 2,3,6 and 12 of FIG. 3B has already been made. Thus, for the purposes of this example, the path through the flowcharts of FIGS. 3B–3E are set from the flowchart of FIG. 3A, i.e. the transactional mode will always be assumed. However, it should be noted that decision steps 2,3,6 and 12 will be required when the decision to implement transactional processing is made external from the flowchart of FIG. 3A. Consequently, the steps included in FIGS. 3B–3E requiring decisions are shown as such, regardless of the assumptions made for the purposes of this example.

At step 1 FIG. 3B, application 32 has initialized local transaction manager 36 which is in communication with the communications manager 38 through interface 39. Application 32 is also in direct communication with communication manager 38 via interface 35. Step 2 then determines whether communication manager 38 is in a transactional mode (previously determined by the flowchart of FIG. 3A). If it is determined that CM 38 is not in a transactional mode, then only communications functions such as transmitting and receiving information are to be performed. The present invention proceeds to step 10 where the communications information is sent and received. The purely communication function implemented at step 10 allows local communication manager 38 to communicate with any remote communication manager, such as CM 48 of transaction processing system 41.

However, at step 2 of FIG. 3B, it has been determined by step of FIG. 3A that communication manager 38 is in a transactional mode, i.e. is to perform some transactional processing functions, then the present invention determines whether communications manager 38 is to process transactional information at step 3. As this is the initial operation and transactional information is to be processed by communication manager 38, then step 4 of FIG. 3B outlines the duties to be performed by CM 38 in performing this function.

Flowchart 3C illustrates in more detail the steps which must be implemented by CM 38 in a transactional information processing.

At step 1 of FIG. 3C, transactional information processing by CM 38 is started and step 2 determines whether the transactional responsibility lies with transactional manager 36 or communications manager 38. In this case, the present invention is considered to be operating as a communication service which provides the communication functionality required by TM 36 during transactional event processing. That is, CM 38 acts as a conduit for communications between local TM 36 and all remote participating transaction managers. For example, referring to FIG. 4, local CM 38 contacts remote transaction managers 46, 46a and 46b on behalf of local TM 36 with a prepare message, via remote communications managers 48, 48a and 48b. This prepare message essentially queries remote TMs 46, 46a and 46b as to whether their respective transactions are to be committed, or aborted. The remote transaction managers 46, 46a, 46b are responsible for determining from resources 44, 44a, 44b whether their portion of the transaction should be committed or aborted. This information is then transmitted to local CM 38 as site information. CM 38 then makes this information available to local TM 36, which uses the information to create a reference list indicating the status of remote TMs 46, 46a, 46b i.e. commit, abort. Local transaction manager 36 then determines from this list whether the transaction should be aborted, or committed, by tallying the reported status received from the remote TMs 46, 46a, 46b.

Further, the hybrid mode delegates more transactional responsibility from local TM 36 to local CM 38. In this case, local TM 36 transfers the responsibility for polling the remote TMs 46, 46a, 46b and building the reference list, to local CM 38. Therefore, CM 38 sends the prepare message to remote TMs 46, 46a, 46b. Remote resources 44, 44a, 44b then communicate their transactional status to their respective transaction managers 46, 46a, 46b. Consequently, CM 38 must maintain a list of all participating remote transaction managers and is responsible for presenting a single abort, or commit status, representative of all participating remote transaction managers to local TM 36. That is, CM 38 communicates to TM 36 the combined totals of the transactional status of all participating remote TMs. TM 36 does not know which remote resources are being utilized and transparency is maintained between the local transaction manager 36, and all remote TMs and resources. TM 36 maintains responsibility for the final decision as to whether the transaction is to be aborted, or committed. However, the steps required to arrive at the point of making the decision are simplified since TM 36 only knows that a single abort, or commit message is presented by CM 38. Thus, TM 36 is not aware of any remote transaction managers, or resources. In this mode, the decision to abort, or commit is based entirely on the status presented by CM 38 and the abort, commit status of any participating local resources 34.

To summarize, in the communications service mode, TM 36 utilizes CM 38 as a communication conduit through which the prepare message is sent and the abort, commit replies are received from remote TMs 46, 46a, 46b. However, in the hybrid mode, more transactional responsibility is delegated to the communications manager such that CM 38 polls, or compiles the status of, the remote TMs and builds a reference list indicating the abort, commit, status of each remote TM. This reference list is then summarized, or tallied by CM 38 and the results are presented to TM 36 in the form of a single abort, or commit message. TM 36 then makes a decision regarding the outcome of the transaction based upon this summary and the status of any participating local resources. In this manner, transparency between TM 36 and all remote TMs and resources is maintained. In effect, TM 36 views the transaction as being entirely local, i.e. TM 36 is only cognizant of local resources 34 and CM 38.

If communication manager 38 has responsibility for the transaction then the flowchart of FIG. 3C proceeds to step 3 wherein communication manager 38 maintains a resource list which may include all remote resources with the transaction, e.g., remote data base and file resources 44, remote communication manager 48, or the like. At step 4, communication manager 38 then registers as a communications manager with transaction manager 36. Subsequent to step 4 the transactional information process ends at step 8, assuming communication manager 38 was determined to have transaction manager responsibility at step 2. However, assuming that transaction manager 36 is not responsible for the two phase commit of the remote resources (i.e. non-hybrid operation) and since it has been determined by the flowchart of FIG. 3A (outside of this example, the determination would have been made at step 6) that TM 36 is to have transactional management responsibility then the flowchart of FIG. 3C proceeds to step 5 where it determines the direction of the communications between local transaction processing system 31 and remote transaction processing system 41. Since, transaction management responsibility exists (determined outside of this example at step 5), the initial communications are outbound, i.e. from communications manager 38 to communications manager 48. Thus, communications manager 38 must perform the functions outlined in step 6 of FIG. 3C. For example, communications manager 38 must record the migration of the transaction from the local system 31 to remote systems, e.g. 41, and maintain a record of the transaction processing systems to which the current transaction has migrated. Communication manager 38 must also provide site information to transaction manager 36, i.e. the information required to transmit the outbound transaction information to the remote transaction processing systems. Additionally, CM 38 must get information from local transaction manager 36 to be output to remote transaction manager 46, e.g. local TM 36 must provide information such as a transaction identifier (TID), as well as the context of the transaction to be communicated. After step 6 is performed the transactional information portion of the present invention ends at step 8.

Having sent the message, the remote site then processes an inbound message at step 7. Communication manager 48 must record transaction management propagation information, i.e. which remote transaction processing system is sending this information. Additionally at step 7, local CM 48 must give the remote transaction manager information (transaction identifier and context) to the local transaction manager 36. After step 7 has been performed, the transactional information stage ends at step 8.

Returning to the flowchart of FIG. 3B all of the transaction information previously discussed with regard to FIG. 3C is appended to any messages being transmitted between communication managers 38 and 48. It should be noted that the content of this information at step 5 (FIG. 3B) is dependent upon whether communication manager 38 is receiving or transmitting transactional information. For example, if communications manager 38 is transmitting information to remote communication manager 48, then information such as the transaction identifier and the context of the transactional information will be appended to the message (step 6 of FIG. 3C). Subsequent to step 5, the communication manager 38 sends and/or receives the previously discussed data at step 10.

After sending all messages, the communication operation proceeds to step 6 where it is determined whether the communications manager 38 is processing a transactional event. If so, transactional event processing occurs at step 7 and includes transactional management information exchange and building of an event list.

The flowchart of FIG. 3D represents the functions implemented by communications manager 38 during step 7 of the flowchart of FIG. 3B. Referring to FIG. 3D, transactional event processing is started at step 1 and step 2 determines the direction of the communication, i.e. is the communication inbound to local communications manager 38 or outbound from local resource communication manager 38 to remote communication manager 48. In this case the communication is initially outbound since a transaction processing mode has been assumed for the purposes of this example. Since the communication is initially outbound the communications manager 38 receives information regarding the transaction from transactional manager 36 and builds an event list (reference list) which includes all participating transaction managers. At step 4 of FIG. 3D, local communications manager 38 then notifies remote communication manager 48 of the forthcoming reference list. For outbound communications the communication manager 38 builds the event list and notifies participating remote communications managers of the the forthcoming communication of the event list after which, the transactional event processing ends at step 7. However, if the communications are inbound from a remote communications resource 48 to local communication manager 38, the steps required to be performed by the communications manager are reversed. That is, communications manager 38 is first notified at step 5 of the forthcoming event list which has been generated by remote communications manager 48, working in conjunction with remote transaction manager 36. At step 6 the actual list is then received by communications manager 38, from communications manager 48. Subsequent to step 6 the transaction event processing then ends at step 7 of FIG. 3D.

Again referring to FIG. 3B, the transactional event information, i.e. event lists and notification thereof, which have been processed by communications manager 38 and 48, as discussed with reference to FIG. 3D, are then built into a transaction message at step 8 of the flowchart of FIG. 3B. This transaction message is then communicated between local and remote transactional processing systems via a communication interface 51, or the like at step 10. At this point in the example the communications manager operation of the present invention, i.e steps 2–8 and 10, has been described.

If it is determined at step 6 that a communication manager 38 does not perform transactional event processing, then the transaction operation of FIG. 3B proceeds to step 12 where it is determined whether communication manager 38 is to perform two phase commit processing for the remote resources. If so, then the previously noted hybrid function of the present invention will be implemented whereby pure communications services, communications manager operations and transaction processing will be invoked. Step 9 of FIG. 3B represents the two phase commit processing wherein all participating resources e.g. 38 and 48 are synchronized along with all other remote resources, such as data base and file resources 34. FIG. 3E is a flowchart which represents the steps of the typical two phase commit protocol. At step 1 the two phase commit is started and at step 2 the commit protocol is implemented, based upon site information. That is, communication manager 38 notifies all other participating communications manager 48 that a two phase commit is being implemented and prepares a list of operations contained in the transaction. If all transactional operations are communicated to CM 38 as being successful then the transaction is committed and entered on the list previously prepared by CM 38. However, if at least one of the operations is not successful then the transaction operation is aborted. The application 32 then has responsibility for re-implementing the desired transactional operations. At step 3 of the flowchart of FIG. 3E, the communications manager 38 must unregister itself from the resource list maintained for the transactional manager 36. The initial registration of communication manager 38 occurred at step 4 of FIG. 3C. Subsequent to unregistration of communication manager 38, the two phase commit protocol ends at step 4 of FIG. 3E. It should be noted that the transaction information processing, transactional event processing and two phase commit processing functions of the transactional operation of the present invention are not independent of one another. For example, the communication manager 38 was registered in the transactional information processing phase, but must be unregistered in the two phase commit stage of transaction operation processing. It can be seen that a communications manager may or may not act as a transactional information processor, and concurrently therewith may or may not act a transactional event processor or two phase commit processor. Again, subsequent to step 9 (the two phase commit protocol) the commit information is communicated to participating transaction managers at step 10 of FIG. 3B.

If at step 12, it was determined that two phase commit should not occur, i.e. transaction processing was initiated by means other than step 2 of the flowchart of FIG. 3A, then transactional operations as represented by the flowchart of FIG. 3B proceeds to step 10 such that the communication manager 38 acts as a purely communications service with no transactional management function. It can be seen that at step 2 of FIG. 3B the communications manager 38 may be determined to be in a transactional mode, but continuing through steps 3, 6, 12, the communications manager 38 may not be functioning to process transactional information, transactional events or two phase commit. Thus, the result is identical as that reached at step 2 where it was determined that the communications manager was not in a transactional mode (pure communications function). Also, it can be seen how communication manager 38 acts as (1) a true communication service (steps 2 and 10), (2) communication manager function (steps 2–8 and 10), and (3) a hybrid communications manager/transaction manager (steps 2–10 and 12). Finally, subsequent to the actual communication (step 10) of the data processed during the transactional information, transactional event, and two phase commit stages of transaction operation, the flowchart of FIG. 3B ends at step 11.

Referring to the flowchart of FIG. 3A, performance of the transactional operations of step 3 have now been described in relation to the flowchart of FIGS. 3B–3E and in the context of the elements of FIG. 2. Thus, at step 4 of FIG. 3A it is then determined whether another transactional operation is to be performed and if so the new transaction is begun at step 3. However, if there are no transactional operations which need to be performed, then the transaction process ends at step 5. Thus, application 32 has now completed the required transaction processing and may continue performance of any other desired operations.

Although certain preferred embodiments have been shown and described, it should be understood that many changes and modifications may be made therein without departing from the scope of the appended claims.

What is claimed is:

1. A communications system which allows a plurality of different communications protocols to be utilized in a distributed transactional processing environment which includes a local site having at least one local transaction manager and resource, and at least one remote site having at least one remote transaction manager and resource, said system comprising:
    at least one local communications manager and one remote communications manager at each of said local and remote sites, respectively, for providing communications between said local site and said remote site, independent of which of said plurality of communications protocols is being used by said local transaction manager and said remote transaction manager, by said local communications manager providing to said local transaction manager and said remote communications manager providing to said remote transaction manager information relating to which said local and remote sites are participating in a transaction, the characteristics of said resource at the participating local and remote sites and the actual data being transferred between the local and remote sites;
    means, within each said communications manger, for performing transaction processing operations, between said local and remote sites, which are normally performed by said transaction manager;
    means for allowing a program application to directly access said resource and said communications manager, independent of said transaction manager; and
    means for maintaining said communications manager separately from said transaction manager.

2. A system according to claim 1 wherein said communication manager comprises means for sending and for receiving data communications between said local transaction manager and said at least one remote transaction manager.

3. A system according to claim 2 wherein said communication manager further comprises:
  means for maintaining a list of all of said resources participating in a transaction; and
  means for registering said communication manager with said transaction manager.

4. A system according to claim 2 wherein said communication manager further comprises:
  means for determining whether said communications are inbound to said local transaction manager or outbound from said local transaction manager;
  means for recording the migration of said outbound communication to said remote sites;
  means for obtaining remote site information corresponding to said remote transaction manager, having received said migrated outbound communication, and for presenting said remote site information to said local transaction manager; and
  means for providing local site information corresponding to said local transaction manager, having sent said migrated outbound communication, and for presenting said local site information to said remote transaction manager.

5. A system according to claim 2 wherein said communications manager further comprises:
  means for determining whether said communications are inbound to said local transaction manager or outbound from said local transaction manager;
  means for recording the propagation, to other participating ones of said remote transaction managers, of said inbound communications from said local transaction manager;
  means for obtaining local site information corresponding said local transaction manager, sending said propagated inbound communication, and for presenting said local site information to said remote transaction manager; and
  means for providing remote site information corresponding to said remote transaction manager, receiving said propagated inbound communication, and for presenting said remote site information to said local transaction manager.

6. A system according to claim 2 wherein said communications manager further comprises:
  means for determining whether said communications are inbound to said local transaction manager or outbound from said local transaction manager;
  means for recording an operation included within a transaction to be sent to and performed by said remote transaction manager, via said outbound communication;
  means for maintaining a reference list, including all of said recorded operations of said transaction communicated to said remote transaction managers; and
  means for notifying said remote transaction managers of the forthcoming reference list via said outbound communication.

7. A system according to claim 2 wherein said communication manager further comprises:
  means for determining whether said communications are inbound to said local transaction manager or outbound from said local transaction manager;
  means for receiving notification of a forthcoming reference list, generated by said remote transaction manager and including operations within a transaction which are to be performed by said local transaction manager;
  means for notifying said local transaction manager of said forthcoming reference list, said reference list being transmitted to said local transaction manager by an inbound communication; and
  means for receiving said reference list from said remote transaction manager, via said inbound communication.

8. A system according to claim 2 wherein said communications manager further comprises:
  means for synchronizing said local and remote communication managers participating in said transaction;
  means for synchronizing said local and remote resources participating in said transaction;
  means for unregistering said communications manager from said transaction manager;
  means for compiling a status of all operations, within said transaction, being performed by said remote transaction managers; and
  means for presenting the status to said local transaction manager in the form of a single abort or commit message.

9. A method to be implemented on a data processing system for allowing a plurality of different communication protocols to be utilized in a distributed transactional processing environment including a local site having at least one local transaction manager and resource, and at least one remote site having at least one remote transaction manager and resource, said method comprising the steps of:
  providing at least one local communication manager at said local site and one remote communication manager at said remote site to enable communications between said local site and said remote site, independent of which of said plurality of communications protocols is being used by said local transaction manager and said remote transaction manager, by said local communications manager providing to said local transaction manager and said remote communications manager providing to said remote transaction manager information relating to which said local and remote sites are participating in a transaction, the characteristics of said resource at the participating local and remote sites and the actual data being transferred between the local and remote sites;
  performing, by said communications manager, transaction processing operations, between said local and remote sites, which are normally performed by said transaction manager;
  allowing a program application to directly access said resource and said communications manager, independent of said transaction manager; and
  maintaining said communications manager separately from said transaction manager.

10. A method according to claim 9 wherein said step of providing communications comprises the steps of sending and receiving data communications between said local transaction manager and said at least one remote transaction manager.

11. A method according to claim 10 wherein said step of providing communications further comprises the steps of:
  maintaining a list of all of said resources participating in a transaction; and registering said communication manager with said transaction manager.

12. A method according to claim 10 wherein said step of providing communications further comprises the steps of:
   determining whether said communications are inbound to said local transaction manager or outbound from said local transaction manager;
   recording the migration of said outbound communication to said remote sites;
   obtaining remote site information corresponding to said remote transaction manager, having received said migrated outbound communication, and for presenting said remote site information to said local transaction manager; and
   providing local site information corresponding to said local transaction manager, having sent said migrated outbound communication, and for presenting said local site information to said remote transaction manager.

13. A method according to claim 10 wherein said step of providing communications further comprises the steps of:
   determining whether said communications are inbound to said local transaction manager or outbound from said local transaction manager;
   recording the propagation, to other participating ones of said remote transaction managers, of said inbound communications from said local transaction manager;
   obtaining local site information corresponding said local transaction manager, sending said propagated inbound communication, and for presenting said local site information to said remote transaction manager; and
   providing remote site information corresponding to said remote transaction manager, receiving said propagated inbound communication, and for presenting said remote site information to said local transaction manager.

14. A method according to claim 10 wherein said step of providing communications further comprises the steps of:
   determining whether said communications are inbound to said local transaction manager or outbound from said local transaction manager;
   recording an operation included within a transaction to be sent to and performed by said remote transaction manager, via said outbound communication;
   maintaining a reference list, including all of said recorded operations of said transaction communicated to said remote transaction managers; and
   notifying said remote transaction managers of the forthcoming reference list via said outbound communication.

15. A method according to claim 10 wherein said step of providing communications further comprises the steps of:
   determining whether said communications are inbound to said local transaction manager or outbound from said local transaction manager;
   receiving notification that a reference list, generated by said remote transaction manager and including operations within a transaction which are to be performed by said local transaction manager;
   notifying said local transaction manager of said forthcoming reference list, said reference list being transmitted to said local transaction manager by an inbound communication; and receiving said reference list from said remote transaction manager, via said inbound communication.

16. A method according to claim 10 wherein said step of providing communications further comprises the steps of:
   synchronizing said local and remote communication managers participating in said transaction;
   synchronizing said local and remote resources participating in said transaction;
   unregistering said communications manager from said transaction manager;
   compiling a status of all operations, within said transaction, being performed by said remote transaction managers; and
   presenting the status to said local transaction manager in the form of a single abort or commit message.

* * * * *